US011232542B2

(12) United States Patent
Wang et al.

(10) Patent No.: US 11,232,542 B2
(45) Date of Patent: Jan. 25, 2022

(54) AUTOMATED NOISE ATTENUATION IN FREQUENCY DOMAINS

(71) Applicant: MICRO FOCUS LLC, Santa Clara, CA (US)

(72) Inventors: Jin Wang, Shanghai (CN); Zhu Jing Wu, Shanghai (CN); Jun Lu, Shainghai (CN); Gang Chen, Shanghai (CN); Zhen Cui, Shanghai (CN)

(73) Assignee: MICRO FOCUS LLC, Santa Clara, CA (US)

( * ) Notice: Subject to any disclaimer, the term of this patent is extended or adjusted under 35 U.S.C. 154(b) by 140 days.

(21) Appl. No.: 16/617,177

(22) PCT Filed: Jul. 31, 2017

(86) PCT No.: PCT/CN2017/095258
§ 371 (c)(1),
(2) Date: Nov. 26, 2019

(87) PCT Pub. No.: WO2019/023875
PCT Pub. Date: Feb. 7, 2019

(65) Prior Publication Data
US 2021/0158485 A1 May 27, 2021

(51) Int. Cl.
G06T 5/00 (2006.01)
G06T 7/70 (2017.01)
(Continued)

(52) U.S. Cl.
CPC ............ *G06T 5/002* (2013.01); *G06T 3/4015* (2013.01); *G06T 5/10* (2013.01); *G06T 7/70* (2017.01);
(Continued)

(58) Field of Classification Search
CPC ......... G06T 5/002; G06T 7/70; G06T 3/4015; G06T 5/10; G06T 2207/10024; G06T 2207/20056; H04N 5/23229
See application file for complete search history.

(56) References Cited

U.S. PATENT DOCUMENTS 5,173,788 A * 12/1992 Ohta .................. H04N 1/40075
358/1.9
6,407,404 B1* 6/2002 Yokoyama ........... G01N 21/956
250/208.1
(Continued)

FOREIGN PATENT DOCUMENTS

CN  101326549 B  12/2008
CN  101877124 A  11/2010
(Continued)

OTHER PUBLICATIONS

Abu-Ein, A.A.; A Novel Methodology for Digital Removal of Periodic Noise Using 2d Fast Fourier Transforms; http://www.m-hikari.com/ces/ces2014/ces1-4-2014/abueinCES1-4-2014.pdf: Jan. 2014: 14 pages.
(Continued)

*Primary Examiner* — Phuoc Tran

(57) ABSTRACT

In some examples, an apparatus for automated removal of noise in a frequency domain receives an image captured by an image sensor, converts at least a portion of the image into a frequency domain image, identifies a position in the frequency domain image, the position indicating a boundary between target content in the frequency domain image and noise in the frequency domain image, and removes content in the frequency domain image outside the boundary, to produce a noise-attenuated image.

20 Claims, 6 Drawing Sheets

(51) Int. Cl.
G06T 3/40 (2006.01)
G06T 5/10 (2006.01)
(52) U.S. Cl.
CPC ............... *G06T 2207/10024* (2013.01); *G06T 2207/20056* (2013.01)

(56) References Cited

U.S. PATENT DOCUMENTS

| | | |
|---|---|---|
| 2005/0276515 A1 | 12/2005 | Shekter |
| 2007/0126893 A1 | 6/2007 | Wang |
| 2011/0247042 A1* | 10/2011 | Mallinson ........ H04N 21/44008 725/86 |
| 2015/0116506 A1 | 4/2015 | Yeh |

FOREIGN PATENT DOCUMENTS

| | | |
|---|---|---|
| CN | 102201110 B | 9/2011 |
| CN | 103745443 A | 4/2014 |
| CN | 105301810 A | 2/2016 |
| KR | 20160026281 A | 3/2016 |

OTHER PUBLICATIONS

International Search Report / Written Opinion; PCT/CN2017/095258; dated Mar. 12, 2018; 9 pages.

* cited by examiner

AUTOMATED NOISE ATTENUATION IN FREQUENCY DOMAINS

BACKGROUND

An image sensor can be used to capture images of objects, such as printed materials, display device screens, three-dimensional (3D) objects, and so forth. In some situations, captured images can contain noise, which reduces the quality of the images.

BRIEF DESCRIPTION OF THE DRAWINGS

Some implementations of the present disclosure are described with respect to the following figures.

Figure 1:
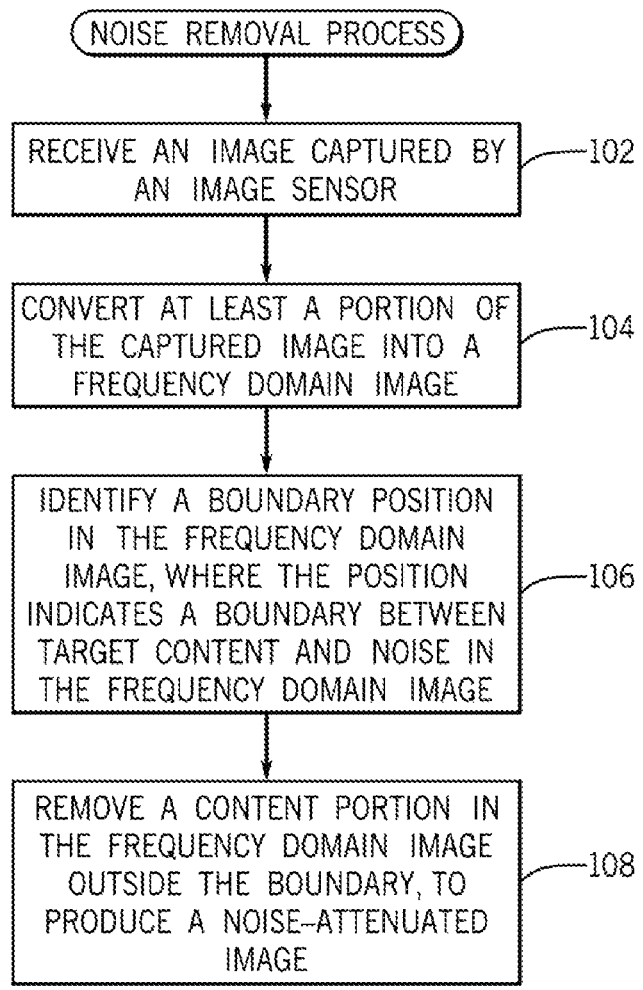
FIG. 1 is a flow diagram of a noise removal process according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

When an image sensor such as a digital camera captures an image displayed by a display device such as computer monitor or digital television that has a lower resolution compared with the resolution of the camera, the captured image may show a noise grid pattern due to oversampling. A "noise grid pattern" can refer to a pattern of visible artifacts in an image that appear generally at multiple points of a grid or other regular pattern. The noise grid pattern is an example of noise that is included in the captured image. The noise grid pattern causes distortion of the target content in the captured image.

The noise grid pattern can be visible to a user when viewing the captured image. Moreover, when processing is to be applied to the image that includes the noise grid pattern, the quality of the output produced by the processing can suffer. An example type of processing is optical character recognition (OCR), which can be applied to an image containing text to recognize text characters in the image and convert the text into a machine representation that can be useful for other purposes. For example, the machine representation of the text can be edited using a word processing application or other type of application. If OCR is applied to an image containing a noise grid pattern, then the OCR may fail to recognize certain text characters or may produce incorrect text characters.

Although reference is made to OCR as an example of processing that can be applied to a captured image, it is noted that other types of processing can be applied in other examples, such as filtering an image, and so forth.

Traditional noise removal techniques do not adequately remove noise that is arranged in a grid or other regular pattern. In accordance with some implementations of the present disclosure, as shown in FIG. 1, a noise removal process includes receiving (at 102) an image captured by an image sensor. The captured image can be of an image displayed by a display device. In other examples, the captured image can be of another object.

The noise removal process further includes converting (at 104) at least a portion of the captured image into a frequency domain image. The captured image is in a first domain that is different from the frequency domain. For example, the first domain can be a spatial domain that defines points in space. Pixels of the captured image are arranged at different points in space. The space can be a two-dimensional (2D) space that has coordinates in two dimensions (e.g., X and Y dimensions). In other examples, the captured image can be an image in three-dimensional (3D) space.

In alternative examples, the first domain of the captured image can be a time domain, where pixels of the captured image are arranged along different points in time. In other examples, the first domain of the captured image can have other dimensions, or combinations of different dimensions (such as spatial dimensions and time dimensions).

The converting performed (at 104) can be a conversion of the captured image in the spatial domain or time domain to the frequency domain. In some implementations, the frequency domain can include two frequency dimensions, such that the converted image is a frequency domain image in multiple frequency dimensions.

The noise removal process further identifies (at 106) a boundary position in the frequency domain image, where the boundary position indicates a boundary between target content in the frequency domain image and noise in the frequency domain image. As used here, "target content" can refer to the content of an image that is intended to be captured, such as the content of an image displayed by a display device, or the content that represents an object that is the target of the image capture. The content of the frequency domain image thus includes both the target content and noise. A goal of the noise removal process according to some implementations of the present disclosure is to remove the noise from the target content, such that the resulting image includes just the target content or includes the target content with attenuated noise.

Details regarding the determination of the boundary position are provided further below.

Once the boundary position is identified (at 106), the boundary between the target content in the frequency domain image and noise can be derived. The noise removal process removes (at 108) a content portion in the frequency domain image outside the boundary, to produce a noise-attenuated image. A content portion that is outside the boundary is considered noise, and can be removed. A content portion inside the boundary is considered target content, and is kept. Removing a content portion can refer to completely deleting or eliminating the content portion, or applying attenuation on the content portion to reduce intensity or amplitude values of the attenuated content portion.

A content portion "outside the boundary" can refer to the content portion having a specified positional relationship to the boundary in the frequency domain.

Figure 2:
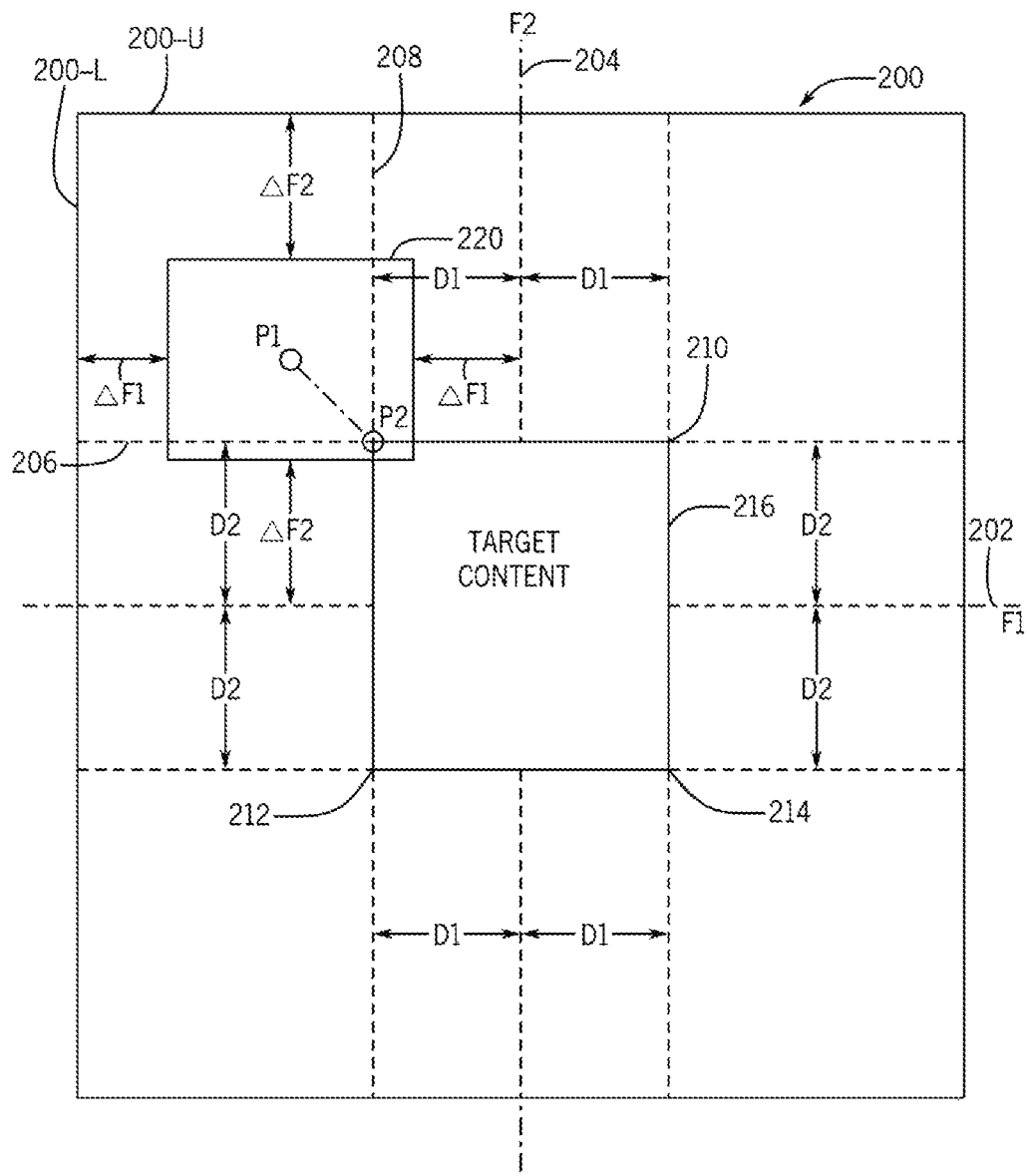
FIG. 2 is a block diagram of an image in a frequency domain that includes a scan area and an identified boundary position, according to some examples.

FIG. 2 shows an image 200 in the frequency domain that has two frequency dimensions, represented as F1 (a horizontal axis 202 that crosses through the center of the frequency domain image 200) and F2 (a vertical axis 204 that crosses through the center of the frequency domain image 200). In an example shown in FIG. 2, a boundary position (identified at 106 in FIG. 1) is represented as P2, which is a position in the frequency domain.

As explained further below, the boundary position P2 is used to define a rectangular boundary 216 that has four corners at the following respective positions: P2, 210, 212, and 214. A content portion of the image 200 inside the rectangular boundary 216 is the target content of the image 200, while a content portion of the image 200 outside the rectangular boundary 216 is considered to be noise.

In some examples, the image 200 can be captured by an image sensor. The captured image 200 is that of an image displayed by a display device. As a result, the image 200 may show a noise grid pattern. In general, a target content of an image does not include repeated objects at different frequencies. In contrast, a noise grid pattern can include repeating noise peaks at multiple frequencies. The non-repeating target content is located at lower frequencies closer to the center of the frequency domain (including the F1 and F2 dimensions), while the repeating noise content has repeating high intensity values at higher frequencies (higher values of F1 and F2).

The following describes an example of how the other positions 210, 212, and 214 are defined once the boundary position P2 is identified. From the positions P2, 210, 212, and 214, the four corners of the rectangular boundary 216 can be determined.

A horizontal line 206 and a vertical line 208 both intersect P2 in the frequency domain. P2 is a first distance D1 on the left of the vertical axis 204 along an axis parallel to the horizontal axis 202, and a second distance D2 above the horizontal axis 202 along an axis parallel to the vertical axis 204.

Once D1 and D2 are determined based on the position P2, the other positions 210, 212, and 214 can be determined based on D1 and D2. The position 210 is located on the horizontal line 206 the distance D1 to the right of the vertical axis 204. The position 212 is located on the vertical line 208 the distance D2 below the horizontal axis 202. The position 214 is located at a point that is the distance D1 on the right of the vertical axis 204 and the distance D2 below the horizontal axis 202.

Although FIG. 2 shows the boundary 216 as having a rectangular shape, it is noted that in other examples, the boundary 216 can have a different shape. The shape can be a closed polygon, a circle, an ellipse, or any other closed shape. In other examples, the boundary 216 can be in the form of a curve or a line, and does not have to have a closed shape. In the latter examples, a content portion on one side of the boundary is considered to be outside the boundary (and thus considered to be noise), while a content portion on the other side of the boundary is considered to be inside the boundary (and thus considered to be the target content).

The following describes how the position P2 is identified in the context of FIG. 2. FIG. 2 shows a scan area 220, which is a specified sub-region within the image 200. The scan area 220 is a specified offset away from the center of the frequency domain that includes the F1 and F2 frequency dimensions.

The image 200 includes a collection of pixels. Each pixel in the collection of pixels has an intensity value, such as a value that represents a color of the pixel. The scan area 200 includes a subset of the pixels in the collection of pixels. P2 is a position within the scan area 200 that is determined based on the intensity value of a pixel at position P1.

In the example of FIG. 2, the scan area 220 is defined as a rectangle with a right side that is a distance ΔF1 on the left of the vertical axis 204, and a distance ΔF1 on the right of the left edge 200-L of the image 200. The upper side of the scan area 220 is a distance ΔF2 from the upper edge 200-U of the image 200, and the lower side of the scan area 220 is a distance ΔF2 from the horizontal axis 202. The distance ΔF1 can be defined as a specified percentage (e.g., 10% or other percentage) of the overall width of the image 200, and the distance ΔF2 can be defined as a specified percentage (e.g., 10% or other percentage value) of the overall height of the image 200.

In other examples, the scan area 220 can be defined in a different way, with different distances from the horizontal axis 202, the vertical axis 204, the left edge 200-L, and the right edge 200-U. In other examples, the scan area 220 can have a different shape, such as a circular shape, an oval shape, and so forth. In addition, although the scan area 220 is depicted as being in the left, upper quadrant of the image 200, the scan area 220 can alternatively be located in other quadrants of the image 200 in other examples. Moreover, the scan area 220 can include a contiguous region in the image 200, or a collection of discrete and separate regions in the image 200.

Within the scan area 220, the noise removal process finds a peak intensity value of pixels in the scan area 220. Each pixel has an intensity value (a color intensity value). Among the intensity values of pixels in the scan area 220, the noise removal process identifies the peak intensity value as the intensity value that is larger than the other intensity values of pixels in the scan area 220. The position of the pixel with the peak intensity value is identified as P1.

Once the peak intensity value is identified, then a pixel having an intensity value that is a specified percentage (e.g., 10% or other percentage) of the peak intensity value is identified. The identified peak intensity value in the scan area 220 is the peak noise value. The specified percentage is a threshold applied on the peak noise value to find neighboring noise pixels around the pixel having the peak noise value.

In the example of FIG. 2, the pixel that has the specified percentage of the peak intensity value is at position P2, which is closer to the center of the image 200 than P1. By identifying the pixel at position P2, the noise removal process can remove not only the noise pixel that has the peak intensity value, but also neighboring noise pixels as well. In examples where there are multiple pixels that share the intensity value at the specified percentage of the peak intensity value, then one of the multiple pixels can be selected as the pixel at position P2. The pixel selected can be the pixel, from among the multiple pixels, that is closest to the center of the image 200.

The boundary 216 derived from the position P2 allows for removal of as much noise as possible, while keeping the non-noise pixels (including those that are part of the target content of the image 200).

Figure 3:
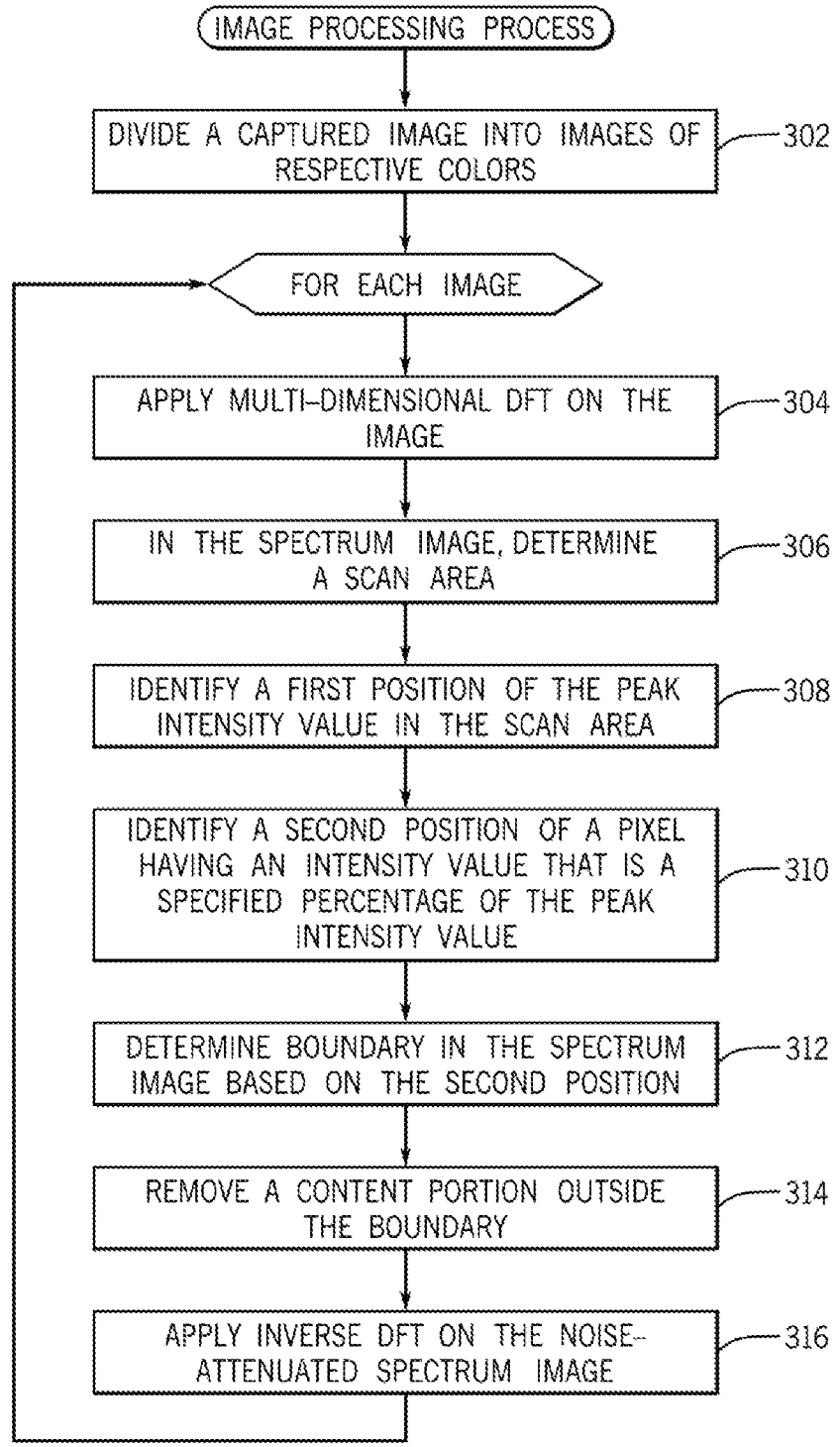
FIG. 3 is a flow diagram of an image processing process according to further examples.

FIG. 3 is a flow diagram of an image processing process according to some examples. The image processing process divides (at 302) a captured image (captured by an image sensor) into images of respective colors. For example, the captured image may be in the RGB (red, green, blue) color space, and the dividing performed (at 302) divides the captured image into a first image for the R color channel, a second image for the G color channel, and a third image for the B color channel. In other examples, the captured image can be in a different color space, and the dividing performed (at 302) divides the captured image into images of other color channels.

The image processing process performs tasks 304-316 for each image of the multiple images for respective color channels divided from the captured image. For each image of a respective color channel, the image processing process applies (at 304) a multi-dimensional Discrete Fourier Transform (DFT) (at 304) on the image. The multi-dimensional OFT converts the image that is initially in one domain (spatial domain or time domain) into a multi-dimensional frequency domain. In some examples, the multi-dimensional DFT is a two-dimensional DFT, such that the converted image in the frequency domain has two frequency dimensions.

The following represents a one-dimensional OFT that is applied on an image represented as $\{x_n\}$, where n=0 to N−1 (N≥2 and representing the number of pixels in the image for the respective color channel in the first domain, such as the spatial domain or time domain).

$$X_k = \sum_{n=0}^{N-1} \left(x_n \times \cos\left(-2\pi k \frac{n}{N}\right) + i\sin\left(-2\pi k \frac{n}{N}\right)\right), k \in \mathbb{Z} \quad \text{(Eq. 1)}$$

where $x_n$ represents the intensity value of the pixel at index n, and k is the current frequency being considered. $X_k$ is the intensity value (corresponding to amplitude and phase, for example) of the pixel at frequency k, and is a complex number. Each frequency k is part of $\mathbb{Z}$, which represents the set of frequency values. Using Euler's formula to simplify the function of Eq. 1, the following is derived:

$$E\left(\frac{-2\pi kn}{N}\right) = \cos\left(-2\pi k \frac{n}{N}\right) + i\sin\left(-2\pi k \frac{n}{N}\right), \quad \text{(Eq. 2)}$$

$$X_k = \sum_{n=0}^{N-1} x_n \times E\left(\frac{-2\pi kn}{N}\right), \quad \text{(Eq. 3)}$$

Because an image includes pixel values in a two-dimensional matrix, the DFT is applied in two dimensions. The DFT applied in two dimensions is expressed as:

$$X_{k_1 k_2} = \sum_{m=0}^{M-1} x_{mn} \times E\left(\frac{-2\pi k_1 m}{M}\right) \times \sum_{n=0}^{N-1} E\left(\frac{-2\pi k_2 n}{N}\right), \quad \text{(Eq. 4)}$$

where M represent the number of pixels of the image in the vertical axis, N represents the number of pixels of the image in the horizontal axis, in and n are indexes of a pixel being considered, (m=0, . . . , M−1) and (n=0, . . . , N−1), and $x_{mn}$ is the intensity value of the pixel at a position defined by in and n. In Eq. 4, $k_1$ is the horizontal frequency dimension, while $k_2$ is the vertical frequency dimension. Accordingly, $X_{k_1 k_2}$ is the intensity value of the pixel at horizontal frequency $k_1$ and vertical frequency $k_2$ in the image.

Once the multi-dimensional OFT is applied (at 304) on the image for the respective color channel, an image in the frequency domain is obtained. The image in the frequency domain is also referred to as a spectrum image. In the spectrum image, the image processing process determines (at 306) a scan area, such as the scan area 220 shown in FIG. 2.

The image processing process then identifies (at 308) a first position of the peak intensity value in the scan area. This first position is the position P1 in FIG. 2, for example.

Once the first position of the peak intensity value is identified, the image processing process identifies (at 310) a second position of a pixel that has an intensity value that is a specified percentage of the peak intensity value. The identified second position is position P2 in FIG. 2, for example.

The image processing process determines (at 312) a boundary (e.g., 216 in FIG. 2) in the spectrum image based on the second position. The image processing process then removes (at 314) a content portion outside the boundary, which effectively removes or attenuates noise in the image. After removal of the content portion outside the boundary, a noise-attenuated spectrum image is provided.

The image processing further applies (at 316) an inverse DFT on the noise-attenuated spectrum image to produce an image in the original domain (spatial domain or time domain). The image in the original domain produced from the noise-attenuated spectrum image is a noise attenuated image in the original domain.

The inverse OFT can be performed according to the following:

$$x_{mn} = \frac{1}{MN} \sum_{k_1=0}^{M-1} X_{k_1 k_2} \times E\left(\frac{-2\pi k_1 m}{M}\right) \times \sum_{k_1=0}^{N-1} E\left(\frac{-2\pi k_2 n}{N}\right). \quad \text{(Eq. 5)}$$

Once each of the images in the different color channels has been processed according to FIG. 3, multiple noise-attenuated images for the respective color channels are produced. The multiple noise-attenuated images can then be combined to produce an output noise-attenuated image that is a version of the captured image with noise attenuated.

Figure 4:
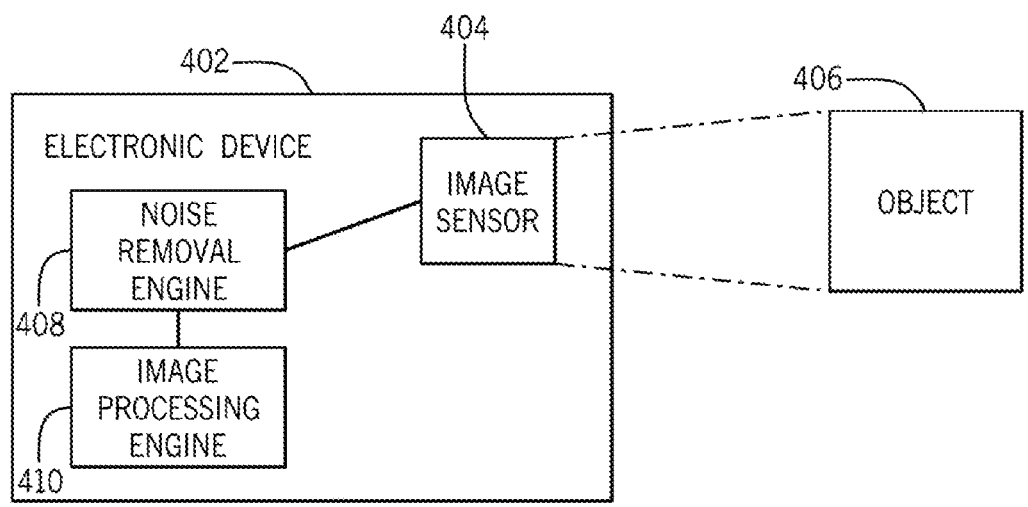
FIG. 4 is a block diagram of an arrangement that includes an electronic device and an object, in accordance with some examples.

FIG. 4 is a block diagram of an example arrangement that includes an electronic device 402, which can be a computer (e.g., notebook computer, desktop computer, tablet computer, etc.), a smartphone or other type of mobile device, a game appliance, or any other type of electronic device. The electronic device 402 includes an image sensor 404, such as a camera. The image sensor 404 can capture an image of an object 406, which can be an image displayed by a display device or another type of object. Although only one image sensor 404 is shown in FIG. 4, it is noted that the electronic device 402 can include multiple image sensors to capture the object 406.

The electronic device 402 includes a noise removal engine 408, which receives a captured image from the image sensor 404, and applies a noise removal process, such as those depicted in FIGS. 1 and 3, to produce a noise-attenuated image.

An "engine" can refer to a hardware processing circuit, which can include any or some combination of the following: a microprocessor, a core of a multi-core microprocessor, a microcontroller, a programmable gate array, a programmable integrated circuit device, or any other hardware processing circuit. In other examples, the noise removal engine 408 can be implemented as a combination of a hardware processing circuit and machine-readable instructions executable on the hardware processing circuit.

The electronic device 402 can also include an image processing engine 410, which is to apply image processing (e.g., OCR, filtering, etc.) to the noise-attenuated image produced by the noise removal engine 408. For example, the electronic device 402 can receive a user request to perform an OCR on the captured image. In response to the request, the image processing engine 410 applies the OCR on the noise-attenuated image from the noise removal engine 408 to produce a user-requested output (e.g., a document containing text in the image captured by the image sensor 404).

Figure 5:
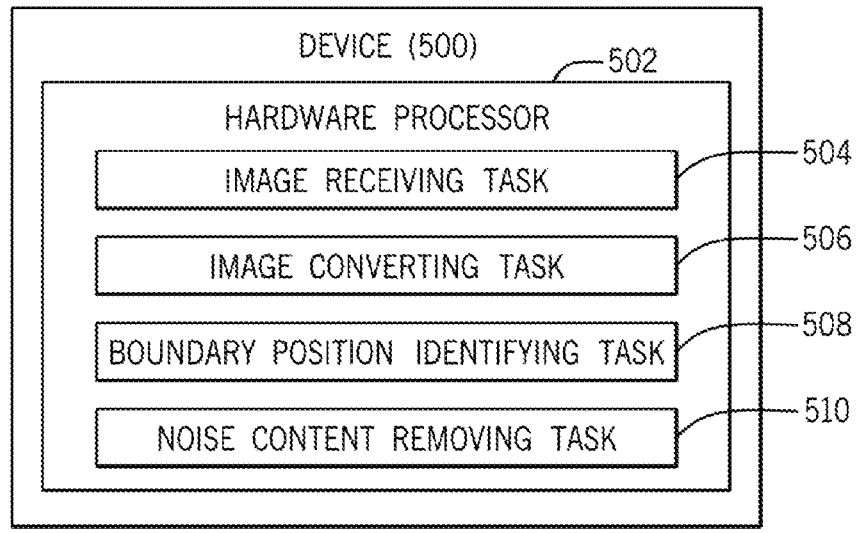
FIG. 5 is a block diagram of a device according to further examples.

FIG. 5 is a block diagram of a device 500 or other apparatus that includes a hardware processor 502 to perform various tasks. A hardware processor performing a task can refer to one hardware processor performing the task, or multiple hardware processors performing the task. The hardware processor can be implemented as a hardware processing circuit, or a combination of a hardware processing circuit and machine-readable instructions executable on the hardware processing circuit.

The tasks that can be performed by the hardware processor 502 includes an image receiving task 504 to receive an image captured by an image sensor. The tasks further include an image converting task 506 to convert at least a portion of the image into a frequency domain image. The tasks further include a boundary position identifying task 508 to identify a position in the frequency domain image, the position indicating a boundary between target content in the frequency domain image and noise in the frequency domain image. The tasks additionally include a noise content removing task 510 to remove content in the frequency domain image outside the boundary, to produce a noise-attenuated image.

Figure 6:
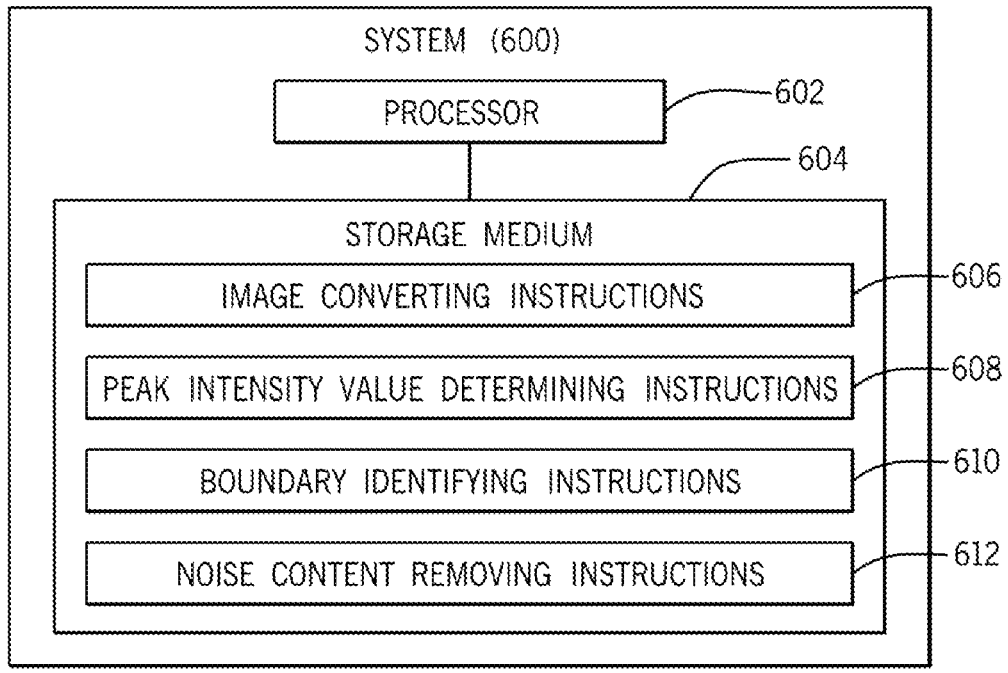
FIG. 6 is a block diagram of a system according to other examples.

FIG. 6 is a block diagram of a system 600 that includes a processor 602 and a non-transitory machine-readable or computer-readable storage medium 604 storing machine-readable instructions that are executable on the processor 602 to perform various tasks. Machine-readable instructions executable on the processor 602 can refer to the machine-readable instructions executable on one processor or on multiple processors.

The machine-readable instructions include image converting instructions 606 to convert an image produced from image data captured by an image sensor into a frequency domain image. The machine-readable instructions further include peak intensity value determining instructions 608 to determine, in a scan area that is located a distance from a center of the frequency domain image, a peak intensity value. The machine-readable instructions additionally include boundary identifying instructions 610 to identify a boundary based on the peak intensity value. The machine-readable instructions also include noise content removing instructions 612 to remove content in the frequency domain image outside the boundary, to produce a noise-attenuated image.

Figure 7:
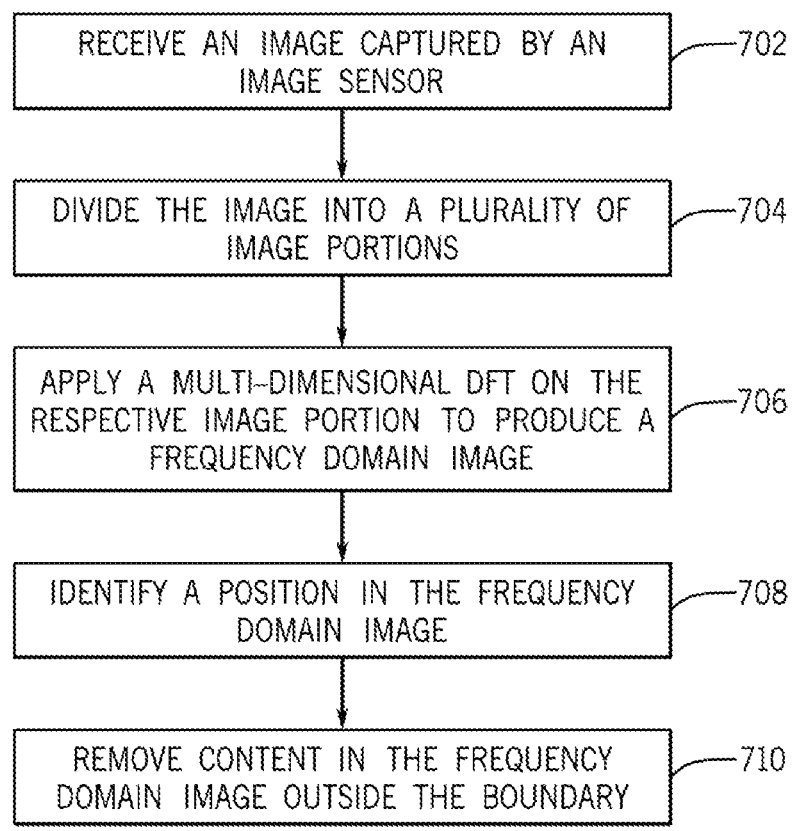
FIG. 7 is a flow diagram of a noise removal process according to additional examples.

FIG. 7 is a flow diagram of a process of an electronic device according to some implementations. The process includes receiving (at 702) an image captured by an image sensor. The process further divides (at 704) the image into a plurality of image portions corresponding to a plurality of color channels. The process performs the tasks 706, 708, and 710 for each respective image portion of the plurality of image portions, the electronic device.

The process applies (at 706) a multi-dimensional DFT on the respective image portion to produce a frequency domain image comprising a plurality of frequency dimensions, and identifies (at 708) a position in the frequency domain image, the position indicating a boundary between target content in the frequency domain image and noise in the frequency domain image. The process further includes removing (at 710) content in the frequency domain image outside the boundary, to produce a noise-attenuated image.

The storage medium 604 of FIG. 6 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. An apparatus for automated attenuation of noise in a frequency domain, comprising:
 a hardware processor to:
  receive an image captured by an image sensor;
  convert the received image into a frequency domain image;
  determine, in the frequency domain image, a scan area that is offset by a predetermined distance from a center of the frequency domain image;
  identify, in the scan area, a first pixel having a peak intensity value;
  identify, in the scan area, a second pixel having a certain intensity value that is a predetermined percentage of the peak intensity value of the first pixel;
  based on a position of the second pixel in the scan area, determine a boundary between target content and noise in the frequency domain image; and
  remove the noise in the frequency domain image outside the boundary, to produce a noise-attenuated image having the target content.

2. The apparatus of claim 1, wherein the noise-attenuated image is in the frequency domain, and wherein the hardware processor is caused to:

convert the noise-attenuated image in the frequency domain to a noise-attenuated image in a spatial or time domain.

3. The apparatus of claim 2, wherein the hardware processor is caused to process the noise-attenuated image in the spatial or time domain to produce a user-requested output.

4. The apparatus of claim 3, wherein, to produce the user-requested output, the hardware processor is caused to apply an optical character recognition on the noise-attenuated image in the spatial or time domain.

5. The apparatus of claim 1, wherein the received image is captured by the image sensor of a mobile device.

6. The apparatus of claim 1, wherein the noise comprises a pattern of noise caused by capturing the image displayed on a display device.

7. The apparatus of claim 1, wherein, to convert the received image into the frequency domain image, the hardware processor is caused to apply a multi-dimensional Discrete Fourier Transform to produce the frequency domain image having a plurality of frequency dimensions.

8. The apparatus of claim 1, wherein the boundary between the target content and the noise in the frequency domain image has a rectangular shape, and
wherein, to determine the boundary in the frequency domain image, the hardware processor is caused to utilize the position of the second pixel as a first corner of the boundary and identify three other corners of the boundary around the center of the frequency domain image.

9. The apparatus of claim 1, wherein the second pixel having the certain intensity value is closer to the center of the frequency domain image than the first pixel having the peak intensity value.

10. The apparatus of claim 1, wherein the scan area is a first distance away from a vertical axis that crosses through the center of the frequency domain image, and a second distance away from a horizontal axis that crosses through the center of the frequency domain image.

11. A system comprising:
a processor; and
a non-transitory storage medium storing instructions that when executed cause the processor to:
convert an image produced from image data captured by an image sensor into a frequency domain image;
determine a scan area that is located a predetermined distance from a center of the frequency domain image;
identify, in the scan area, a first pixel having a peak intensity value;
identify, in the scan area, a second pixel having a certain intensity value that is a predetermined percentage of the peak intensity value of the first pixel;
identify a boundary between target content and noise in the frequency domain image based on a position of the second pixel in the scan area; and
remove the noise in the frequency domain image outside the boundary, to produce a noise-attenuated image having the target content.

12. The system of claim 11, wherein, to convert the image produced from the image data into the frequency domain image, the instructions are executable to cause the processor to:
divide the image produced from the image data into image portions in each of a plurality of colors contained in the image;
apply a multi-dimensional Discrete Fourier Transform on the image portions in each of the plurality of colors to generate image portions in a frequency domain; and
combine the image portions in the frequency domain into the frequency domain image.

13. The system of claim 11, wherein the scan area is located at a first distance away from a vertical axis that crosses through the center of the frequency domain image and at a second distance away from a horizontal axis that crosses through the center of the frequency domain image.

14. The system of claim 11, wherein the image is a first image, and wherein the instructions are executable to cause the processor to divide the image data captured by the image sensor into a plurality of images including the first image.

15. The system of claim 11, wherein the boundary is a closed boundary, and wherein the target content of the frequency domain image is within the closed boundary that is kept while the noise in the frequency domain image is outside the boundary that is removed.

16. The system of claim 11, wherein the boundary between the target content and the noise in the frequency domain image has a rectangular shape, and
wherein, to determine the boundary in the frequency domain image, the instructions are executable to cause the processor to utilize the position of the second pixel as a first corner of the boundary and identify three other corners of the boundary around the center of the frequency domain image.

17. The system of claim 11, wherein the instructions are executable to cause the processor to apply a multi-dimensional Discrete Fourier Transform on the image produced from the image data to generate the frequency domain image having a plurality of frequency dimensions.

18. A method comprising:
receiving, by an electronic device, an image captured by an image sensor;
applying, by the electronic device, a multi-dimensional Discrete Fourier Transform on the received image to produce a frequency domain image comprising a plurality of frequency dimensions;
determining, by the electronic device, a scan area that is located a predetermined distance from a center of the frequency domain image;
identifying, by the electronic device, in the scan area, a first pixel having a peak intensity value;
identify, by the electronic device, in the scan area, a second pixel having a certain intensity value that is a predetermined percentage of the peak intensity value of the first pixel;
identifying, by the electronic device, a boundary between target content in the frequency domain image and noise in the frequency domain image based on a position of the second pixel in the scan area; and
removing the noise in the frequency domain image outside the boundary, to produce a noise-attenuated image having the target content.

19. The method of claim 18, wherein the second pixel having the certain intensity value is closer to the center of the frequency domain image than the first pixel having the peak intensity value.

20. The method of claim 18, wherein the scan area is located at a first distance away from a vertical axis that crosses through the center of the frequency domain image and at a second distance away from a horizontal axis that crosses through the center of the frequency domain image.

* * * * *